INVENTORS,
Erich Gronemeyer and
BY Samuel Cherba,

ATTORNEY.

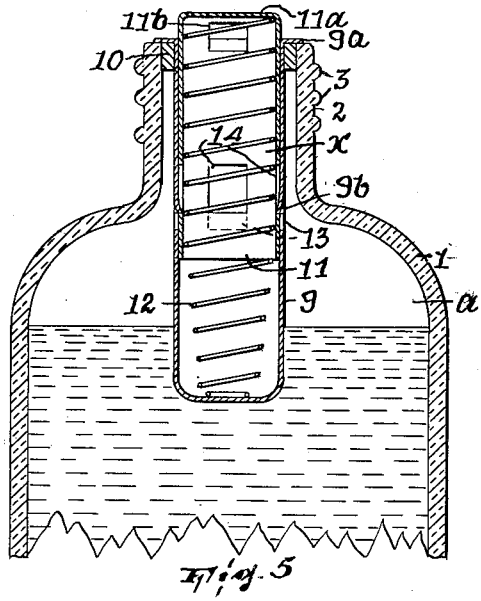
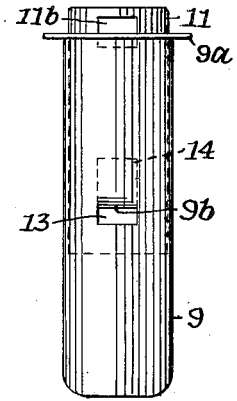
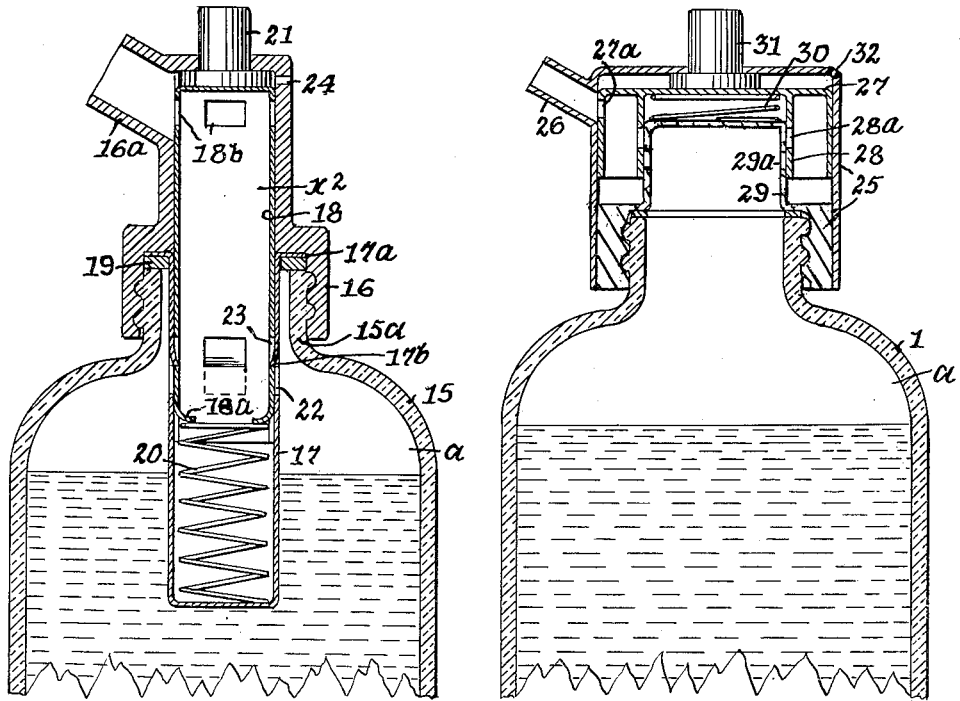

Patented Nov. 14, 1950

2,530,012

UNITED STATES PATENT OFFICE 2,530,012

DISPENSING ATTACHMENT FOR LIQUID CONTAINER NECK, HAVING A RECIPROCABLE MEASURING TRAP COMBINED WITH A DISPENSING VALVE

Erich Gronemeyer, Pompton Plains, and Samuel Cherba, Totowa, N. J.

Application August 2, 1945, Serial No. 608,417

6 Claims. (Cl. 222—356)

This invention relates to liquid dispensers and it consists in a dispenser whereby a limited quantity and actually a measured quantity of liquid may be dispensed on each operation of the dispenser.

Given a bottle (by which we hereinafter mean a liquid container having its discharge opening arranged above the liquid level therein when such container is in normal stationary position but which container is portable and is inverted for pouring off its liquid content) having a liquid-receiving main space, according to our invention what we hereinafter term a rigid walled receiver depends into said space and has its own space providing the discharge passage for the bottle and it comprises a fixed member and a movable member one of which provides the closed lower end of the receiver; and there is present some form of yielding elastic means which normally confines the movable member in that relation to the fixed member in which the space of the receiver is sealed off from said main space, said movable member being movable from said relation to open the receiver at a level above said lower end of the receiver, and there is also means protruding from the bottle for moving said movable member from said relation. Preferably, also, said movable member has means to leave open and to close said passage when such member is respectively in and moved from said relation.

In the drawings, which show possible examples of our invention,

Fig. 5 is a view similar to Fig. 1, illustrating another form;

Fig. 6 is a side elevation of the fixed member of Fig. 5;

Fig. 7 is a view similar to Fig. 1, showing another form; and

Fig. 8 is a similar view of another form.

Figure 1:
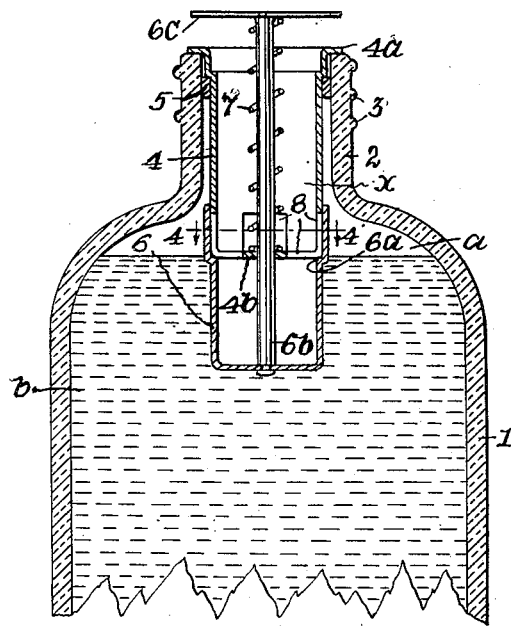
Figs. 1 to 3 are vertical sectional views of one form of the dispenser in different stages of the operation thereof.
Figure 2:
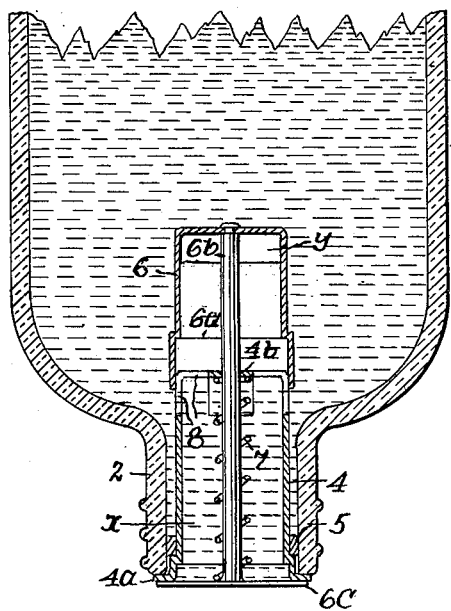
Figure 3:
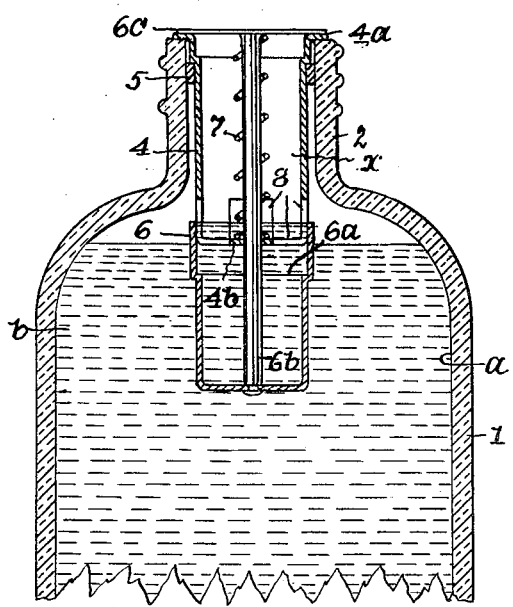
Figure 4:
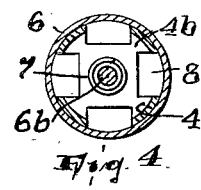
Fig. 4 is a section on line 4—4, Fig. 1.

Referring, first, to Figs. 1 to 3:

The bottle has a reduced upper portion or neck 2 which may be threaded at 3 to receive a cap (not shown) to be screwed on the neck. At $a$ is the liquid-receiving main space of the bottle, the liquid being shown at $b$.

The rigid walled receiver depending into said space and having its own space providing the discharge passage for the bottle comprises the following parts: One such part is a passaged member 4, here tubular, extending through the neck and having an annular flange 4a seated on the top of the neck, said member being confined to fixed relation to the neck by an annular gasket 5 interposed between said member and the neck and which incidentally serves to seal off the space between them against vagrant liquid flow therethrough. Another part of the receiver is a cup like member 6, here generally tubular and having its upper or open end portion normally in telescoped relation to the lower end portion of member 4, it having an interior shoulder 6a which abuts member 4 to limit upward movement of member 6 by pressure of a yielding elastic means 7 in the form, here, of a coiled spring; member 4 having at its lower end a transverse wall 4b in the form of a grid and member 6 having an upstanding stem 6b coaxial with the receiver and guided by the grid and normally protruding from the upper end of the receiver and there is provided with a downwardly facing abutment 6c, the spring being interposed between such grid and abutment. The abutment may be a disk, as shown, of a diameter to serve as a stopper for the said discharge passage $x$ of the receiver afforded by the bore of the member 4; however, we do not wish it to be understood that any stopper to control the flow from said passage is an essential part of the dispenser, since if the passage is of sufficiently limited cross-sectional area the operator's finger or thumb may serve as a stopper.

With member 6 in the position shown by Fig. 1 the receiver formed by it and member 4 seals off the space of the receiver from the said main space $a$. But the receiver, as indicated, is in some way openable, i. e., to permit discharge flow via passage $x$ from said main space, such opening being at a level suitably above the lower end of the receiver. For this purpose the portion of member 4 including its grid and normally embraced by the upper end portion of member 6 is provided with parts or apertures, as at 8.

The operation in this case is as follows: By downward pressure on means 6b of member 6 when the dispenser is in upright position (Fig. 1) said member is depressed to opening the receiver at 8. With the passage $x$ closed off against discharge therefrom, as by downward pressure of device 6—6b—6c, the dispenser is inverted (Fig. 2) so that the liquid fills the receiver via the breach or opening here afforded at 8 and except for entrapped air at $y$. The dispenser is now returned to its upright position, the said device 6—6b—6c being retained in its last-indicated position until all the liquid in the receiver except what is retained by member 6 drains back into space $a$, whereupon said device is released preparatory to pouring off via passage $x$ the thus-retained and measured part of the liquid.

Figs. 5 and 6:

The parts 1 to 3 are the same as hereinbefore. The rigid walled receiver, depending into space $a$ of the bottle and having its own space providing the discharge passage $x$ for the bottle, comprises these parts: One is an elongated tubular cup-like member 9 extending through the neck and having an annular flange 9a seated on the top of the neck, said member being confined to fixed relation to the neck by an annular gasket 10 interposed and serving to seal off vagrant flow between them. Another part of the receiver is a tubular member 11 having its upper end here closed by the wall 11a and its lower end open, it being in contained, telescoped and close-fitting relation thereto. It is here supported, so as somewhat to protrude from the upper end of member 9, by a spring 12 interposed between wall 11a and the bottom of member 9. The protruding portion of member 11 is provided with a port or aperture 11b for pouring, the aperture being sealed by the neck when member 11 is depressed until wall 11a acts to close the discharge passage x.

With member 11 in the position shown by Fig. 5 the receiver formed by it and member 9 seals off the space of the receiver from the main space a. But the receiver is to be breached to permit flow via said passage from said main space, such breach or opening being at least suitably above the lower end of the receiver. Hence member 9 is provided with a port or aperture 13 and member 11 is provided with a port or aperture 14, the aperturing at 14 being normally above and hence out of registry with that at 13. In each case the aperturing is in the form of several apertures or ports, which is immaterial. At the top of at least one of the apertures 13 is a lip 9b of member 9 bent into the adjoining aperture 14 of member 11 and coacting therewith as a spline to maintain the apertures 13—14 in vertical registry with each other.

The operation, as will be obvious, is not essentially different from that of the dispenser first described.

Fig. 7:

Here it is shown that the bottle may include, with a bottle 15, a cap 16 affixed to the neck 15a of the latter, as by being screwed thereon. The parts 17 and 18 respectively function substantially the name as the parts 9 and 11. Part 17 has an annular flange 17a which, together with a gasket 19 positioned beneath it, is clamped between the top of the neck and a shoulder of the cap. Part 18 has its bottom open and formed with an internal flange 18a between which and the bottom of part 17 is the spring 20, normally maintaining part 18 in the position shown, or elevated, its upper end portion extending up to near the top of the cap, where it abuts the flanged inner end of a button 21 penetrating the top wall of the cap. The cap has a laterally projecting discharge nozzle 16a. Member 18 fits the bore provided by the parts 16 and 17 sufficiently loosely so that it may freely move therein and it is apertured at 18b to afford communication from the passage x2 of the receiver via such aperturing to the nozzle for pouring, such aperturing being preferably in registry with the nozzle when member 18 is in the position shown. As in the case of the forms previously described the receiver when in said position seals off its space from the main space a of the bottle but is to be opened to permit discharge via passage x2 from said space, with the opening at a level suitably above the lower end of member 17. For this purpose members 17 and 18 are respectively apertured at 22 and 23 substantially the same as the members 9 and 11 of the Fig. 5 form, member 17 having the lip 17b to coact with an aperture 23 as a spline. The operation in this case is, again, not essentially different from that first described. So that the measured quantity of liquid may undergo pouring without gurgling a vent 24 is provided in the top of the cap. This form of the dispenser is useful in dispensing liquors.

Whereas usually the fixed member of the rigid walled receiver will be formed separate from the remainder of the bottle we do not wish to be limited accordingly.

In all the forms shown the parts of the receiver are assumed to be, though not necessarily, of stiff material, as a suitable plastic. In that connection we do not wish to be limited to the elastic means, as 7, being formed separately of either of said parts of the receiver.

Fig. 8 shows a form to illustrate that our invention is not limited to a rigid walled receiver depending into the space a of the bottle but may be more broadly conceived as including what we term an openable liquid receiver not necessarily depending into said space, the term "liquid receiver" being used to mean one which in the normal or upright state of the bottle will retain some liquid the same as such receiver when the latter is upright, as in Fig. 3, for example. In this case said receiver comprises, with a hollow member 25 (here in two parts) screwed on bottle 1 and having a discharge nozzle 26, an inverted cup-shaped member 27 contained and movable up and down in and in telescoped relation to member 25, the two members having telescoped upstanding and depending tubular portions 28—29, respectively, which are apertured at 28a—29a so that the receiver is openable, i. e., via such apertures, when member 27 is depressed, as by a button 31, against the tension of a spring 30 from the position shown until such apertures register with each other. Member 27 also has an aperture 27a which in the normal position shown registers with the outlet of nozzle 26 but is sealed by member 25 when member 27 is depressed. At 32 is a vent to discourage gurgling during pouring. The operation is not essentially different, as will be obvious, from that of the forms previously described.

Given a bottle having a liquid-receiving main space (as a), our invention broadly contemplates means to control the flow from said main space to the exterior of the bottle which includes a liquid receiver (here comprising two parts, as 4—6 in Figs. 1 to 4; 9—11 in Figs. 5–6; 17—18 in Fig. 7; and 25—27 in Fig. 8) but which in any event is collapsible and expansible and which provides a liquid well (hereafter defined) and above the well a breach arranged when opened to connect said spaces and which in one of the collapsed and expanded states of the receiver is open and in the other such state closed, the receiver in any event being normally confined (here by the spring 7, 12, 20 or 30) to that state in which the breach is closed and having a portion of itself (as 6b—6c in Fig. 1, its top wall 11a in Fig. 5 or its top wall in Figs. 7 and 8) accessible from the exterior of the bottle for distorting the receiver to that state in which the breach is open. In Figs. 1 to 4 the breach is closed in the collapsed state of the receiver, whereas in the other figures it is closed in the extended state. The mentioned "well" is that portion of the receiver which is below the breach and serves to hold liquid cup-fashion.

Having thus fully described our invention what we claim is:

1. A measured quantity liquid dispenser adapted for use with a bottle having a liquid receiving main cavity and a neck communicating therewith, the neck having means for receiving and securing a cap thereover, the dispenser comprising a rigid walled receiver adapted to be positioned in the neck of the bottle so as not to interfere with application of the cap to the bottle neck, the receiver comprising a first member, such first member being an open tube of such length that the bottom end thereof will project a substantial distance into the neck of the bottle, such first member having a radial flange on its upper end, such flange being adapted to rest upon the upper edge of the bottle, the receiver being completed by a second member, the second member being an upwardly facing elongated cup-shaped member, one of said first and second members being slidably received within the other member in fluid tight relationship therewith, means constantly urging the first and second members into contracted relationship with each other, a stop means for limiting the upward travel of the second member, means comprising a stem connected to the second member and a cover disc attached to the top thereof selectively to close the top end of the first member, the parts being so related that when the second member is at the top of its travel the cover disc projects but a relatively small distance above the top of the first member, the first member having an opening in the wall thereof at a location which will be within the main cavity of the bottle but a substantial distance above the lower end of the second member, the second member having an imperforate portion of its upper wall covering such opening in the first member when the second member is in raised position, the top of the side wall of the second member being so located that when the cover disc attached to the second member is depressed to a level so that it substantially contacts the upper end of the first member the opening in the wall of the first member is uncovered by the wall of the second member to provide a passage through such opening into the receiver.

2. A measured quantity liquid dispenser comprising a bottle having a liquid receiving main cavity and a neck at the top thereof communicating therewith, the neck having means for receiving and securing a cap thereover, a rigid walled receiver positioned in the neck of the bottle so as not to interfere with application of the cap to the bottle neck, the receiver comprising a first member, such first member being an open tube projecting a substantial distance into the neck of the bottle, such first member having a radial flange on its upper end, such flange resting upon the upper edge of the bottle, the receiver being completed by a second member, the second member being an upwardly facing elongated cup-shaped member, one of said first and second members being slidably received within the other member in fluid tight relationship therewith, means constantly urging the first and second members into contracted relationship with each other, a stop means for limiting the upward travel of the second member, means comprising a stem connected to the second member and a cover disc attached to the top thereof selectively to close the top end of the first member, the parts being so related that when the second member is at the top of its travel the cover disc projects but a relatively small distance above the neck of the bottle, the first member having an opening in the wall thereof at a location within the main cavity of the bottle but a substantial distance above the lower end of the second member, the second member having an imperforate portion of its upper wall covering such opening in the first member when the second member is in raised position, the top of the side wall of the second member being so located that when the cover disc attached to the second member is depressed to a level so that it substantially contacts the upper end of the first member, the opening in the wall of the first member is uncovered by the wall of the second member to provide communication between the bottle cavity and the receiver, and means to form a fluid tight connection between the bottle neck and the upper end of the first member of the receiver.

3. A measured quantity liquid dispenser adapted for use with a container having a liquid receiving main cavity and a neck at the top thereof communicating therewith, the neck having means for receiving and securing thereover a cap independent of the dispenser, the dispenser comprising a rigid walled receiver adapted to be positioned in the neck of the container so as not to interfere with the application of the cap to the container neck, and over the top of the dispenser, the receiver comprising a first member having side walls in the form of a tube, the bottom end of such side walls being adapted to project at least a substantial distance into the neck of the container, the receiver being completed by a second member having side walls in the form of a tube, the side walls of one of said members being slidably received within the side walls of the other of said members in fluid tight relationship therewith, means constantly urging one of said members in one direction with respect to the other, a stop means for limiting such relative travel of the two members, one of said members projecting a substantial distance below the other so that it will extend into the cavity of the container, said member having an imperforate cup-shaped lower end forming the lower end of the receiver, selectively operable closure means for the neck of the container attached to the relatively movable member and adapted to project a relatively small distance above the neck of the container when in open, inoperative, position, one of said members having a port in the side wall thereof at a location such that the port will be located within the main cavity of the container but a substantial distance above the lower cup-shaped end of the receiver, the side wall of the other member being so constructed and arranged as to cover and close the port in the side wall of the one member when the members are in one extreme position of travel with respect to each other, and means operatively connecting the selectively operable closure means for the neck of the container with the other member, which covers and closes the port in the side wall of the one member, the selectively operable closure means for the neck of the container being so spaced from the portion of the side wall of the other member which selectively covers and closes the port in the side wall of the one member that when the closure means for the neck of the container is in open, inoperative, position the port in the side wall of the one member is closed, and that when the closure means for the neck of the container is in closed, operative, position such port in the side wall of the one member is open, providing communication between the cavity of the container in the neck of which the receiver is adapted to the placed and the receiver.

4. A measured quantity dispenser adapted for use with a container having a liquid receiving main cavity and a neck at the top thereof communicating therewith, the neck having means for receiving and securing thereover a cap independent of the dispenser, the dispenser comprising a rigid walled receiver adapted to be positioned in the neck of the container so as not to interfere with application of the cap to the container neck, and over the top of the dispenser, the receiver comprising a first member, such first member being an upwardly directed elongated cup-shaped member, such first member being of such length that the bottom end thereof projects a substantial distance into the main cavity of the container when the dispenser is assembled therein, such first member having means thereon for attaching it to the top of the container neck to form a fluid tight connection therewith, the receiver being completed by a second member, the second member being a downwardly facing elongated cup-shaped member, said second member being slidably received within the first member in fluid tight relationship therewith, means constantly urging the first and second members into expanded relationship with each other, a stop means for limiting the upward travel of the second member so that the cup-shaped upper end of such member projects but a relatively small distance above the top of the first member, the second member having a first port in the upper sidewall thereof so positioned as to lie above the top of the first member when the second member is in fully elevated position with respect to the first member and to lie within and to be closed by the side wall of the first member when the second member is depressed so that its upper end lies substantially flush with the upper end of the first member, the first member having a port in the wall thereof at a location within the main cavity of the container but a substantial distance above the lower end of the first member, the second member having an imperforate portion of its lower wall covering and closing such port in the side wall of the first member when the second member is in fully elevated position, the second member having a second port in its lower wall, so located that when the upper cup-shaped end of the second member is depressed to a level substantially that of the top end of the first member the last described ports in the walls of the first and second members coincide to provide communication through such ports between the cavity and the receiver, the first and second ports in the second member being so spaced longitudinally thereof and the port in the first member being so spaced from the top of such first member that at no point within the range of travel of the second member within the first member is there provided into and through the dispenser an open path of communication from the lower end of the receiver to the atmosphere.

5. A measured quantity dispenser comprising a container having a liquid receiving main cavity and a neck at the top thereof communicating therewith, the neck having means for receiving and securing thereover a cap independent of the dispenser, a rigid walled receiver positioned in the neck of the container so as not to interfere with application of the cap to the container neck, and over the top of the dispenser the receiver comprising a first member, such first member being an upwardly directed elongated cup-shaped member, the bottom end of which projects a substantial distance into the main cavity of the container, such first member having means therein for attaching it to the top of the container neck to form a fluid tight connection therewith, the receiver being completed by a second member, the second member being a downwardly facing elongated cup-shaped member, said second member being slidably received within the first member in fluid tight relationship therewith, means constantly urging the first and second members into expanded relationship with each other, a stop means for limiting the upward travel of the second member so that the cup-shaped upper end of such member projects but a relatively small distance above the neck of the container, the second member having a first port in the upper side wall thereof so positioned as to lie above the top of the first member when the second member is in fully elevated position with respect to the first member and to lie within and to be closed by the side wall of the first member when the second member is depressed so that its upper end lies substantially flush with the upper end of the neck of the container, the first member having a port in the wall thereof at a location within the main cavity of the container but a substantial distance above the lower end of the first member, the second member having an imperforate portion of its lower wall covering and closing such port in the side wall of the first member when the second member is in fully elevated position, the second member having a second port, in its lower wall, so located that when the upper cup-shaped end of the second member is depressed to a level substantially that of the top end of the first member the last described ports in the walls of the first and second members coincide to provide communication between the container cavity and the receiver, the first and second ports in the second member being so spaced longitudinally thereof and the port in the first member being so spaced from the top of such first member that at no point within the range of travel of the second member within the first member is there provided into and through the dispenser an open path of communication from the interior of the container to the atmosphere.

6. In the combination set out in claim 5, the means on the top of the first member attaching it to the top of the container neck being a radial flange on the upper end of the first member, such flange being of a diameter no greater than the outer diameter of the upper edge of the container neck.

ERICH GRONEMEYER.
SAMUEL CHERBA.

REFERENCES CITED

The following references are of record in the file of this patent:

UNITED STATES PATENTS

| Number | Name | Date |
|---|---|---|
| 120,047 | Diezel | Oct. 17, 1871 |
| 785,094 | Frieborg | Mar. 21, 1905 |
| 931,984 | Beckman | Aug. 24, 1909 |
| 1,326,053 | Henry | Dec. 23, 1919 |
| 1,741,746 | Naylor | Dec. 31, 1922 |
| 1,735,390 | Henderson | Nov. 12, 1929 |
| 2,128,718 | Strand | Aug. 30, 1938 |
| 2,150,485 | Bernhardt | Mar. 14, 1939 |